(12) United States Patent
Lynar et al.

(10) Patent No.: US 10,043,548 B1
(45) Date of Patent: Aug. 7, 2018

(54) CREATING A WORK BASED ON COGNITIVE STATE

(71) Applicant: International Business Machines Corporation, Armonk, NY (US)

(72) Inventors: Timothy M. Lynar, Carlton (AU); Jorge A. Moros Ortiz, Carlton (AU); Stefan von Cavallar, Sandringham (AU); John M. Wagner, Carlton (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/440,131

(22) Filed: Feb. 23, 2017

(51) Int. Cl.
| | |
|---|---|
| H04N 9/80 | (2006.01) |
| H04N 5/93 | (2006.01) |
| G11B 27/031 | (2006.01) |
| G06K 9/00 | (2006.01) |
| G10L 25/63 | (2013.01) |
| G11B 27/34 | (2006.01) |

(52) U.S. Cl.
CPC ........ *G11B 27/031* (2013.01); *G06K 9/00315* (2013.01); *G10L 25/63* (2013.01); *G11B 27/34* (2013.01)

(58) Field of Classification Search
CPC .. G11B 27/031; G11B 27/34; G06K 9/00315; G10L 25/63
USPC .......... 386/248, 278, 281, 280, 290
See application file for complete search history.

(56) References Cited

U.S. PATENT DOCUMENTS 7,698,238 B2    4/2010   Barletta et al.
2017/0339338 A1*  11/2017   Gordon ............. H04N 5/23219

OTHER PUBLICATIONS

Brain Sciences Foundation, "Mood State Detection", http://brainsciences.org/programs/mood-state/ (retrieved Dec. 7, 2016), 1 page.
Debener et al., "Unobtrusive ambulatory EEG using a smartphone and flexible printed electrodes around the ear", Scientific Reports 5:16743, Nov. 2015, pp. 1-11.
Trans Cranial Technologies ltd., "10/20 System Positioning Manual", 2012, https://www.trans-cranial.com/local/manuals/10_20_pos_man_v1_0_pdf.pdf (retrieved Feb. 22, 2017), 20 pages.

* cited by examiner

*Primary Examiner* — Robert Chevalier
(74) *Attorney, Agent, or Firm* — Cantor Colburn LLP; Louis Percello

(57) ABSTRACT

Embodiments are directed to a computer-implemented method of creating a work. The method includes analyzing a set of media files. Thereafter, a set of metadata files is analyzed. Each metadata file is associated with a media file in the set of media files. A cognitive state of a user is estimated. Thereafter, the work is created from the set of media files based on the estimated cognitive state of the user.

12 Claims, 3 Drawing Sheets

CREATING A WORK BASED ON COGNITIVE STATE

BACKGROUND

The present invention relates in general to the field of computing. More specifically, the present invention relates to systems and methodologies for creating a work based upon the reactions of a user.

Media content communicates information to the public or other interested individuals. Media content exists in many different forms, such as advertisements, videos, images, audio programs, and other information. The information in the media content can be predetermined and/or prerecorded. The media content can be conveyed at a particular time in a particular order. If the media content is not useful to a user, the user is more likely to ignore the media content.

SUMMARY

Embodiments of the invention are directed to a computer-implemented method of creating a work. The method includes analyzing a set of media files. Thereafter, a set of metadata files are analyzed. Each metadata file associated with a media file in the set of media files. A cognitive state of a user is estimated. Thereafter, the work is created from the set of media files based on the estimated cognitive state of the user.

Embodiments of the invention are further directed to a computer system for creating a work. The system includes a memory and a processor system communicatively coupled to the memory. The processor is configured to perform a method that includes analyzing a set of media files. Thereafter, a set of metadata files are analyzed. Each metadata file associated with a media file in the set of media files. A cognitive state of a user is estimated. Thereafter, the work is created from the set of media files based on the estimated cognitive state of the user.

Embodiments of the invention are further directed to a computer program product for creating a work. The computer program product includes a computer-readable storage medium having program instructions embodied therewith, wherein the computer-readable storage medium is not a transitory signal per se. The program instructions are readable by a processor system to cause the processor system to perform a method that includes analyzing a set of media files. Thereafter, a set of metadata files are analyzed. Each metadata file associated with a media file in the set of media files. A cognitive state of a user is estimated. Thereafter, the work is created from the set of media files based on the estimated cognitive state of the user.

Additional features and advantages are realized through techniques described herein. Other embodiments and aspects of the invention are described in detail herein. For a better understanding, refer to the description and to the drawings.

BRIEF DESCRIPTION OF THE DRAWINGS

The subject matter that is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Figure 1:
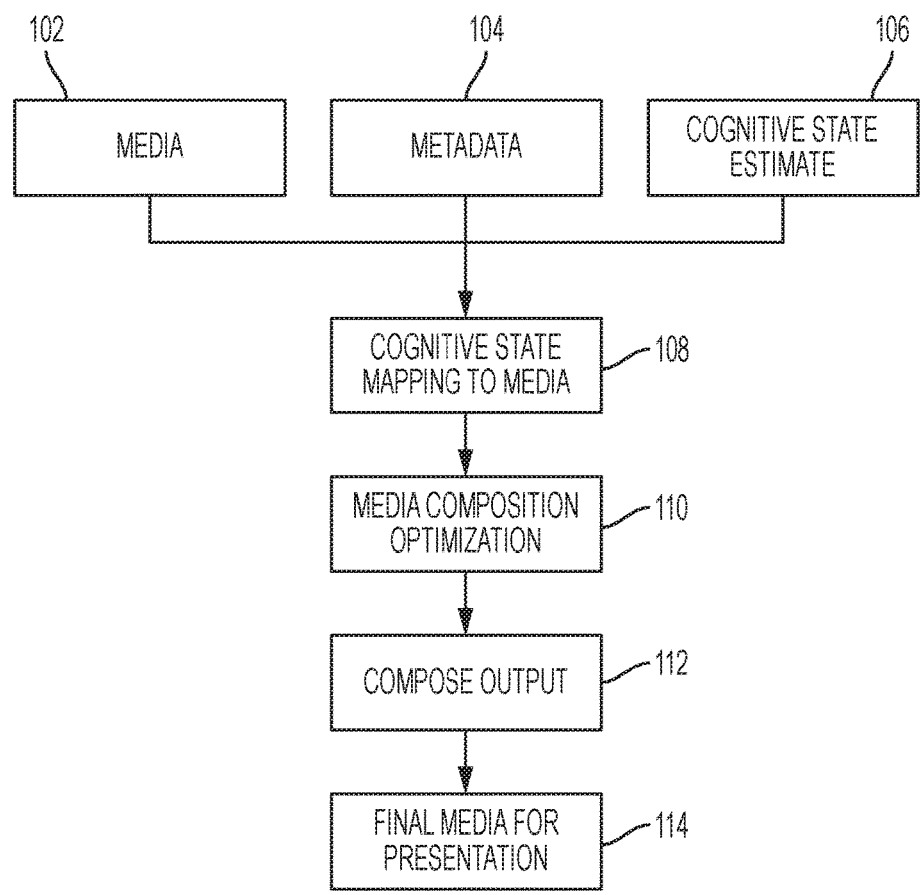
FIG. 1 depicts a flow diagram illustrating the operation of an exemplary embodiment.

Various embodiments of the present invention will now be described with reference to the related drawings. Alternate embodiments can be devised without departing from the scope of this invention. Various connections might be set forth between elements in the following description and in the drawings. These connections, unless specified otherwise, can be direct or indirect, and the present description is not intended to be limiting in this respect. Accordingly, a coupling of entities can refer to either a direct or an indirect connection.

Additionally, although a detailed description of a computing device is presented, configuration and implementation of the teachings recited herein are not limited to a particular type or configuration of computing device(s). Rather, embodiments are capable of being implemented in conjunction with any other type or configuration of wireless or non-wireless computing devices and/or computing environments, now known or later developed.

Furthermore, although a detailed description of various algorithms is included herein, implementation of the teachings recited herein are not limited to embodiments described herein. Rather, embodiments are capable of being implemented in conjunction with any other type of system, now known or later developed.

At least the features and combinations of features described in the immediately present application, including the corresponding features and combinations of features depicted in the figures amount to significantly more than implementing a method of creating a work based on a user's cognitive state. Additionally, at least the features and combinations of features described in the immediately preceding paragraphs, including the corresponding features and combinations of features depicted in the figures go beyond what is well understood, routine and conventional in the relevant field(s).

Many different art forms are pre-planned or pre-scripted. This can include plays, movies, television shows, written music, books, commercials, advertisements, and the like. There are also art forms that are spontaneous or extemporaneous, without specific preparation, changing depending on an artist's connection with the audience, and the like. These can include several different forms of improvisational music (such as jazz), stand-up comedy, improvisational skits, improvisational dance, poetry (such as freestyle rap), and the like. A downside of improvisational art forms is that they require the presence of a live person to make changes to the art. Pre-recorded media is not able to respond to users. Thus, art forms that included improvisation during recording are fixed for display to users.

Embodiments of the present invention address the above-described shortcomings by providing a novel method and system that analyzes a user's reaction to media content and creates a work based on the user's reaction. The work includes media files from a set of media files. While a media file is being presented to a user, the user's reactions are monitored. Based on the user's reactions, different media files from the set of media files are displayed, creating a dynamic experience that can change the work for different users or even for the same user at different times.

To take a simplified example, a work can be a movie, television show, or other video. For a particular scene in the work, the content creator attempted to create a certain type of reaction in the user, for example, making the user sad. If the user is determined to be sad (by detecting the cognitive state of the user in a manner described in further detail below), the user can be shown a first scene. If the user is not sad, the user can be shown a second scene in an attempt to make the user sad.

This concept can be extended to other use cases. If the user is confused, the user can be shown a scene that provides additional explanation. If the user is disinterested, the user can be shown scenes or versions of scenes that are intended to raise the user's interest.

The differences between the first scene and the second scene can vary. The difference can be subtle, such as a change in background music, with the visuals being the same. The difference can be more dramatic, such as showing a different version of the scene to create a certain mood in the user. The difference can be extreme, such as showing a completely different scene that is not shown to users who are already sad. It should be understood that this example can be extended into non-visual works, such as music, spoken word pieces, and the like. In addition, scenes can be shown in a different order based on the user's reactions. Some scenes can be skipped. It should be understood that embodiments are not limited to fictional works. For example, embodiments can be used in an educational setting such that, if the user evidences a lack of understanding of a certain concept, more examples can be given. While some embodiments described herein refer to a user, it should be understood that embodiments can also be operable with multiple users.

Method 100 shown in FIG. 1 is an overview of a general method that accomplishes the above-described tasks according to embodiments of the present invention. The method 100 can be implemented as an algorithm that operates on a computer system 200 (shown in FIG. 2). Method 100 is merely exemplary and is not limited to the embodiments presented herein. Method 100 can be employed in many different embodiments or examples not specifically depicted or described herein. In some embodiments, the procedures, processes, and/or activities of method 100 can be performed in the order presented. In other embodiments, one or more of the procedures, processes, and/or activities of method 100 can be combined or skipped.

A set of media files is supplied to an embodiment of the invention (block 102). Each media file in the set of media files represents a portion of a performance. In general, a content creator records or produces a performance. For one or more of a plurality of sections or subsections of the performance, the content creator creates a plurality of versions. For example, the content creator can create different verses of a song, different scenes of a movie or television show, different versions of a commercial, and the like.

For each media file in the set of media files, metadata is received (block 104). The metadata can indicate, for each media file, the set of cognitive states associated with the media file. For example, a movie or television show can have a scene recorded in two different manners. The first manner can be directed towards users who are showing a first type of reaction as the set of media files is being displayed. The second manner can be directed towards users who are showing a second type of reaction as the set of media files is being displayed. The metadata can include one or more of the cognitive state that is targeted for the associate media file, the importance of the associated media file to the work as a whole, the strength of the effect of the associated media file to the targeted cognitive group, the possible position of the associated media file to the work as a whole, other media files with which the associated media file is not compatible, and other media files with which the associated media file is dependent.

The cognitive state of the user is estimated based on detected inputs (block 106). There are a variety of different manners that can be used to determine the cognitive state of the user. A system containing an embodiment can utilize a computer system (such as system 200) coupled to one or more audio detection devices (such as one or more microphones). The audio detection devices can be coupled to natural language processing units such that any words or instructions uttered by the user is detected and mapped to a cognitive state. In some embodiments, a system is capable of understanding instructions stated by the user. Instructions can be useful in an educational embodiment because the user is able to indicate when he does not understand a first concept or indicate that he does understand a first concept and wants to move to a second concept. In some embodiments, the audio from the user can be analyzed to determine an engagement level of the user. If a first user is talking to a second user about an unrelated topic, the engagement level can be determined to be low. If the user is singing along with the media file, the engagement level can be determined to be high.

A system also can include, coupled to a computer system, one or more video detection devices (such as a camera capable of recording still images or moving images or light sensors) to track the user. The video detection devices are not necessarily limited to images in the visual bandwidth and can include infrared video detection, night vision detection, heat detection, and the like. A system can also include gyroscopic, orientation, or accelerometer sensors to detect movement of a user.

Video detection devices can be coupled to a facial expression analysis module within a computer system. The facial expression module can be configured to receive video images of a user's face and interpret the facial expressions such that the facial expressions can be mapped to various emotions (sadness, confusion, happiness, and the like).

A system can include health monitoring devices, such as heart rate monitors, motion detectors, eye gaze detectors, electroencephalography (EEG) sensors, muscle sensors, and the like. Health monitoring devices can be included in a wearable device, such as headphones, a watch, and the like. These signals also can be mapped to various emotions. For example, a raised heart rate can indicate excitement or fright. A lowered heart rate can indicate calmness. Alpha waves can be detected in the EEG sensors to determine brain activity. A higher value of alpha waves can indicate a relaxed state for a user. Muscle sensors can be located in the neck to determine if a user is stressed or is performing other activities (such as eating).

Based on the cognitive state of the user, the media, and the associated metadata, a work is created from the set of media files. The cognitive state of the user is mapped to the media (block 108). This can be performed by a computer system. This mapping can occur dynamically, during playback of the media files. Each media file within the set of media files can be associated with one or more cognitive states. When a particular cognitive state is detected, the associated media file can be chosen. The mapping can be performed in a variety of different manners. For example, mixed integer programming or other optimization techniques can be used to perform the mapping.

In a given work that comprises multiple media files, there can be only portions of the work that have cognitive mapping. For example, in an hour-long work, there can be only a 5-minute portion that is changeable based on the user's cognitive state. In some embodiments, there can be multiple portions that are changeable. Thus, there can be a 20-minute first normal portion, a 5-minute first changeable portion, a 21-minute second normal portion, and a 6-minute second changeable portion. In some embodiments, there can be a 55-minute portion that is changeable based on the user's cognitive state. There might be portions of the work that are skipped based on the user's cognitive state. Thus, the work can be 50 minutes for a first user and 60 minutes for a second user.

When a media is selected based on the mapping, media composition optimization techniques can be applied to produce a seamless transition between the selected media files (block 110). The media composition optimization techniques can include a variety of different media blending techniques (either now known or developed in the future).

The output work can be composed (block 112). After the transition is created between media files within the set of media files, an output work is created. Thereafter, the final media file output is presented to the user (block 114). The presentation can take one of a variety of different forms now known or developed in the future. In some embodiments, a video display unit (such as a monitor, a television, a virtual reality headset, a projector, a wearable, holographic display, or any other type of device capable of receiving an input and displaying a visual output) is used to display the final media file. In some embodiments, an audio output unit (such as a speaker, headphone, or headset) is used to output audio. In some embodiments, an audio output unit and a video output unit can be present in a single device. Other senses can also be incorporated in some embodiments. Shakers or other transducers can be placed in furniture to cause movement at specific times. Smells can be produced using an aroma creation device in order to stimulate the olfactory senses of the user.

In one or more embodiments, simple rules can be applied to aggregated sensor data to drive media selection and playback. For example, if ambient light level is darkened and the relaxation state of the user is below a certain level, more relaxing media can be selected. In one or more embodiments, selection and playback of media in conjunction with sensor data to analyze correlations between the two. This could enable a more accurate selection and control for personalized playback of media.

Figure 2:
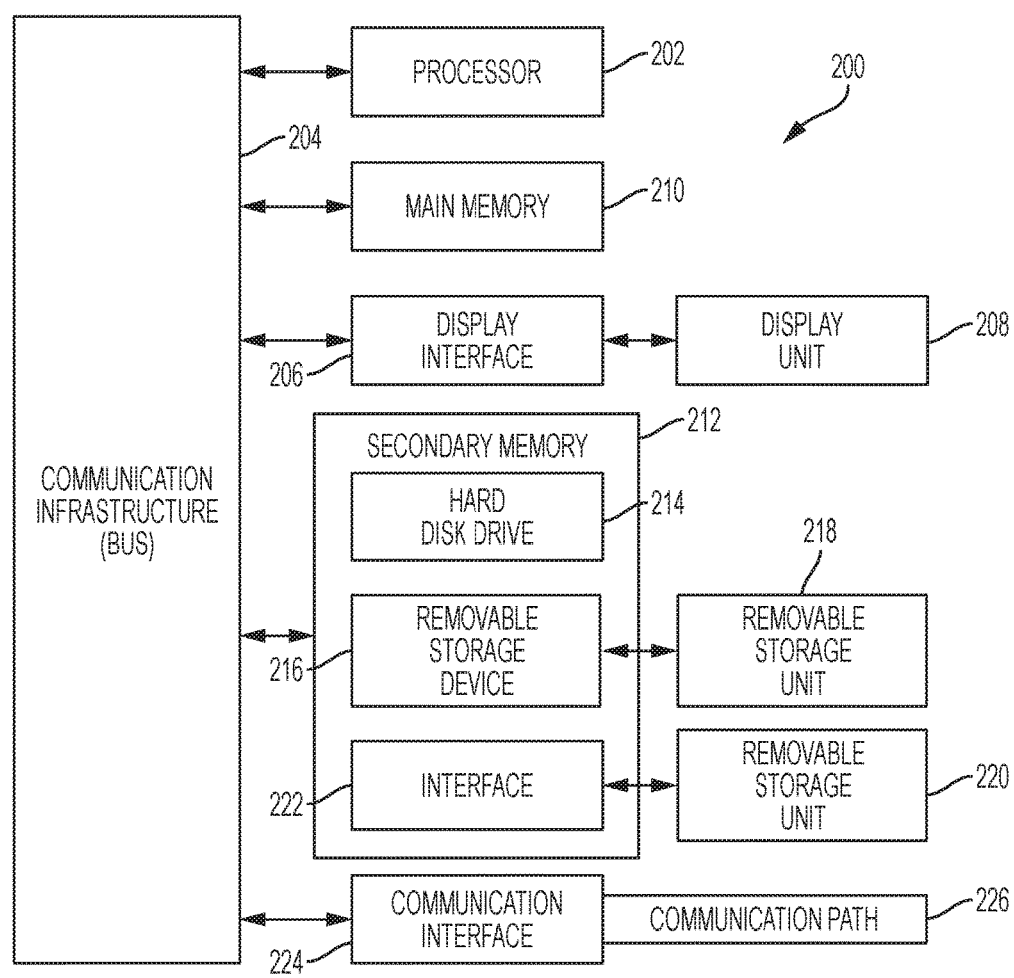
FIG. 2 depicts a computer system capable of implementing hardware components of one or more embodiments.

FIG. 2 depicts a high-level block diagram of a computer system 200, which can be used to implement one or more embodiments. More specifically, computer system 200 can be used to implement hardware components of systems capable of performing methods described herein. Although one exemplary computer system 200 is shown, computer system 200 includes a communication path 226, which connects computer system 200 to additional systems (not depicted) and can include one or more wide area networks (WANs) and/or local area networks (LANs) such as the Internet, intranet(s), and/or wireless communication network(s). Computer system 200 and additional system are in communication via communication path 226, e.g., to communicate data between them.

Computer system 200 includes one or more processors, such as processor 202. Processor 202 is connected to a communication infrastructure 204 (e.g., a communications bus, cross-over bar, or network). Computer system 200 can include a display interface 206 that forwards graphics, textual content, and other data from communication infrastructure 204 (or from a frame buffer not shown) for display on a display unit 208. Computer system 200 also includes a main memory 210, preferably random access memory (RAM), and can also include a secondary memory 212. Secondary memory 212 can include, for example, a hard disk drive 214 and/or a removable storage drive 216, representing, for example, a floppy disk drive, a magnetic tape drive, or an optical disc drive. Hard disk drive 214 can be in the form of a solid state drive (SSD), a traditional magnetic disk drive, or a hybrid of the two. There also can be more than one hard disk drive 214 contained within secondary memory 212. Removable storage drive 216 reads from and/or writes to a removable storage unit 218 in a manner well known to those having ordinary skill in the art. Removable storage unit 218 represents, for example, a floppy disk, a compact disc, a magnetic tape, or an optical disc, etc. which is read by and written to by removable storage drive 216. As will be appreciated, removable storage unit 218 includes a computer-readable medium having stored therein computer software and/or data.

In alternative embodiments, secondary memory 212 can include other similar means for allowing computer programs or other instructions to be loaded into the computer system. Such means can include, for example, a removable storage unit 220 and an interface 222. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 220 and interfaces 222 which allow software and data to be transferred from the removable storage unit 220 to computer system 200.

Computer system 200 can also include a communications interface 224. Communications interface 224 allows software and data to be transferred between the computer system and external devices. Examples of communications interface 224 can include a modem, a network interface (such as an Ethernet card), a communications port, or a PC card slot and card, a universal serial bus port (USB), and the like. Software and data transferred via communications interface 224 are in the form of signals that can be, for example, electronic, electromagnetic, optical, or other signals capable of being received by communications interface 224. These signals are provided to communications interface 224 via communication path (i.e., channel) 226. Communication path 226 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 210 and secondary memory 212, removable storage drive 216, and a hard disk installed in hard disk drive 214. Computer programs (also called computer control logic) are stored in main memory 210 and/or secondary memory 212. Computer programs also can be received via communications interface 224. Such computer programs, when run, enable the computer system to perform the features discussed herein. In particular, the computer programs, when run, enable processor 202 to perform the features of the computer system. Accordingly, such computer programs represent controllers of the computer system. Thus it can be seen from the forgoing detailed description that one or more embodiments provide technical benefits and advantages.

Figure 3:
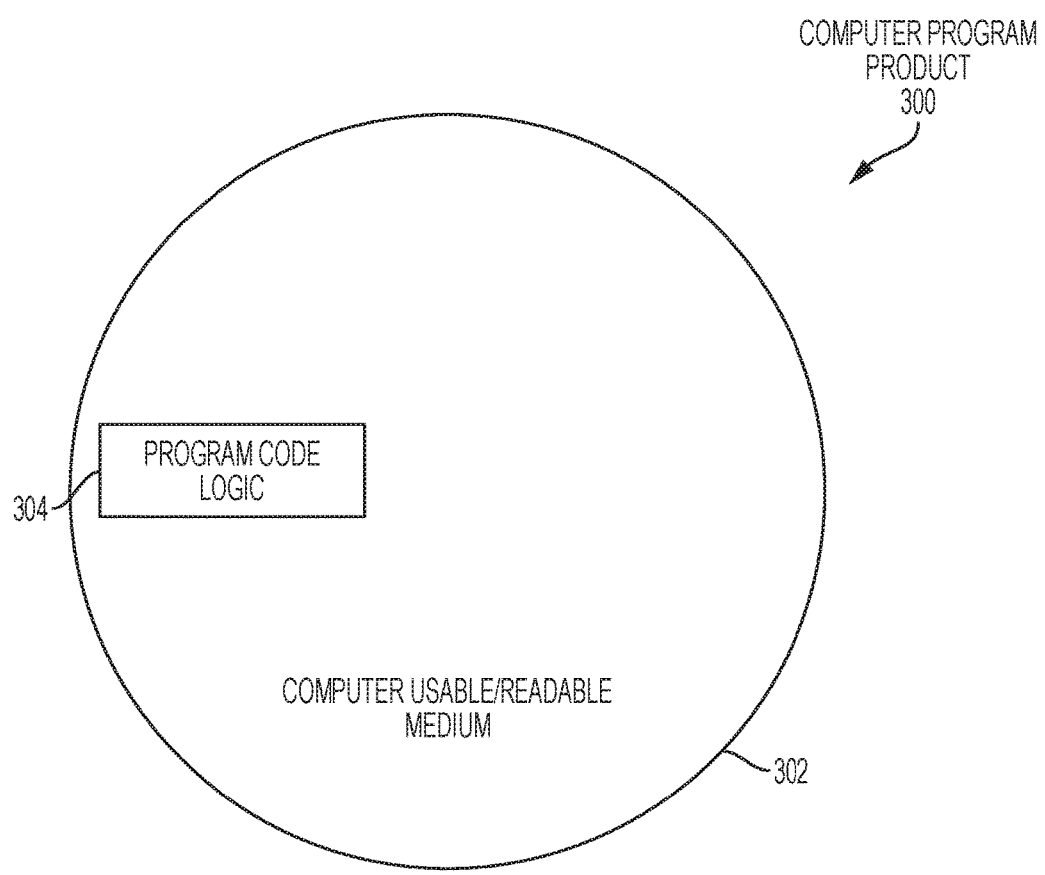
FIG. 3 depicts a diagram of a computer program product according to one or more embodiments.

Referring now to FIG. 3, a computer program product 300 in accordance with an embodiment that includes a computer-readable storage medium 302 and program instructions 304 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the consumer's computer, partly on the consumer's computer, as a stand-alone software package, partly on the consumer's computer and partly on a remote computer or entirely on the remote computer or server. In the latter scenario, the remote computer can be connected to the consumer's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

What is claimed is:

1. A computer-implemented method of creating a work, the method comprising:
    analyzing, using a processor, a set of media files;
    analyzing, using the processor, a set of metadata files, each metadata file associated with a media file in the set of media files;
    estimating, using the processor, a cognitive state of a user; and
    creating, using the processor, the work from the set of media files based on the estimated cognitive state of the user; wherein:
    estimating the cognitive state of the user comprises:
        receiving inputs from a one or more detection devices; and
        creating the estimate of the cognitive state of the user;
    the one or more detection devices includes an audio detection device;
    an audio output from the audio detection device is analyzed to determine the cognitive state of the user;
    the audio detection device is coupled to a natural language processor;
    the natural language processor is configured to map the output of the audio detection device into words; and
    the words are analyzed to determine the cognitive state of the user.

2. The computer-implemented method of claim 1, wherein:
    the one or more detection devices includes a video detection device coupled to a facial expression module; and
    the facial expression module is configured to analyze an output from the video detection device to create the estimate of the cognitive state of the user.

3. The computer-implemented method of claim 1, wherein the one or more detection devices includes a health-monitoring device.

4. The computer-implemented method of claim 1 further comprising presenting the work to the user through the use of an output unit.

5. The computer-implemented method of claim 4 wherein the output unit is selected from the group consisting of an audio output unit, a video display unit, a transducer, and an aroma creation device.

6. A computer system for creating a work, the system comprising:
    a memory; and
    a processor system communicatively coupled to the memory;
    the processor system configured to perform a method comprising:
        analyzing a set of media files;
        analyzing a set of metadata files, each metadata file associated with a media file in the set of media files;
        estimating a cognitive state of a user; and
        creating the work from the set of media files based on the estimated cognitive state of the user; wherein:
    estimating the cognitive state of the user comprises:
        receiving inputs from a one or more detection devices; and
        creating the estimate of the cognitive state of the user;
    the one or more detection devices includes an audio detection device;
    an audio output from the audio detection device is analyzed to determine the cognitive state of the user;
    the audio detection device is coupled to a natural language processor;
    the natural language processor is configured to map the output of the audio detection device into words; and
    the words are analyzed to determine the cognitive state of the user.

7. The computer system of claim 6, wherein:
    the one or more detection devices includes a video detection device coupled to a facial expression module; and
    the facial expression module is configured to analyze an output from the video detection device to create the estimate of the cognitive state of the user.

8. The computer system method of claim 6, wherein creating the work from the set of media files comprises:
    using the cognitive state of the user to select a media file from the set of media files; and
    composing the work based on the selected media file.

9. The computer system of claim 8, wherein composing the work comprises creating a transition between a media file being presented to the user and the selected media file.

10. The computer system of claim 6 further comprising presenting the work to the user through the use of an output unit.

11. The computer system method of claim 10, wherein the output unit is selected from the group consisting of an audio output unit, a video display unit, a transducer, and an aroma creation device.

12. A computer-implemented method of creating a work, the method comprising:
    analyzing, using a processor, a set of media files;
    analyzing, using the processor, a set of metadata files, each metadata file associated with a media file in the set of media files;
    estimating, using the processor, a cognitive state of a user; and
    creating, using the processor, the work from the set of media files based on the estimated cognitive state of the user;
    wherein creating the work from the set of media files comprises:

using the cognitive state of the user to select a media file from the set of media files; and composing the work based on the selected media file; and wherein composing the work comprises creating a transition between a media file being presented to the user and the selected media file.

* * * * *